United States Patent [19]
Miller

[11] 4,127,478
[45] Nov. 28, 1978

[54] MACHINE FOR SALVAGING WASTE CONCRETE MATERIAL

[75] Inventor: William F. Miller, Youngstown, Ohio

[73] Assignee: Hy-Way Heat Systems, Inc., Youngstown, Ohio

[21] Appl. No.: 774,320

[22] Filed: Mar. 4, 1977

[51] Int. Cl.² ............................................. B07B 1/24
[52] U.S. Cl. .................................. 209/240; 209/270; 209/297
[58] Field of Search ............... 209/155, 172, 240–241, 209/243–247, 270, 284, 290, 293, 297, 369, 172.5, 173, 1; 214/17 C, 18 K; 210/210, 456; 198/532, 549, 559, 701, 703; 51/161.1, 161.2

[56] References Cited
U.S. PATENT DOCUMENTS

| | | | |
|---|---|---|---|
| 2,331,135 | 10/1943 | Ovestrud | 209/270 |
| 2,599,402 | 6/1952 | Lindsey | 209/270 |
| 2,836,299 | 5/1958 | Johnson | 209/270 |
| 2,919,808 | 1/1960 | Hilkemeier | 209/155 |
| 2,942,731 | 6/1960 | Soldini | 209/293 |
| 2,983,378 | 5/1961 | Hilkemeier | 209/270 |
| 3,297,410 | 1/1967 | De Iisle | 198/701 |
| 3,541,738 | 11/1970 | Rampe | 51/163.1 |
| 3,596,759 | 8/1971 | King et al. | 209/173 |
| 3,729,087 | 4/1973 | Bruns | 209/245 |

*Primary Examiner*—Robert Halper
*Assistant Examiner*—Jon E. Hokanson
*Attorney, Agent, or Firm*—Webster B. Harpman

[57] ABSTRACT

A machine for receiving mixed concrete from a ready mix truck provides a receiving hopper and an elevator for lifting the material therefrom arranged to discharge it into a classifying rotating drum incorporating a spiral conveyor into which water is sprayed during use. A sump and a secondary conveyor are positioned beneath the classifying drum so that the separated sands, aggregate and other material, washed and separated from the concrete mix, introduced with the cement and waste water are confined to the sump and a separate settling tank from which the fine sands and similar materials can be salvaged.

8 Claims, 4 Drawing Figures

MACHINE FOR SALVAGING WASTE CONCRETE MATERIAL

BACKGROUND OF THE INVENTION (1) Field of the Invention

This invention relates to machines for salvaging waste concrete material such as for example that contained in a ready mix concrete truck and unused at a job site.

(2) Description of the Prior Art

Prior machines for this purpose have been proposed and one such machine is seen in U.S. Pat. No. 2,942,731. An aggregate separating machine is seen in U.S. Pat. No. 2,983,378 and a gravel separator, a foundry sand reclaiming device and an ore washing apparatus are seen in U.S. Pat. Nos. 2,836,299, 2,331,135 and 2,599,402, respectively. Each of these patented devices incorporate a classifying drum into which material can be delivered. Each of the machines attempts separation and classification of the materials introduced and one of them, that of U.S. Pat. No. 2,942,731 attempts a washing action with respect to the concrete present in the concrete mix introduced into the machine. None of the disclosures include a practical means of receiving a batch of mixed unset concrete from a ready mix truck and then delivering it at a predetermined rate and volume which can be controlled by the operator as necessary with respect to the condition of the concrete being handled. None of the machines of the patents disclose a settling tank for settling out and recovering the fines, such as fine sands and the like, which constitute a substantial portion of the mixed concrete and none of the machines teach a practical and efficient apparatus for handling, washing and separating all of the material in wet concrete as highly desirable in considering the environmental impact of the dumping of such wet concrete indiscriminately as frequently takes place at the present time.

SUMMARY OF THE INVENTION

A machine for salvaging waste concrete material incorporates a receiving hopper capable of receiving a sizable amount of wet concrete from a ready mix truck, apparatus for selectively feeding the wet concrete at controlled rates into an inclined classifying and separating drum wherein water is introduced for washing cement from the sand and aggregate present in the concrete mix with the resultant course sand and aggregate being classified as by size and discharged and the water mixed cement and fine sands and the like discharged into a sump and settling tank from which the fine sands and the like may be recovered and from which the clarified water may be recirculated.

DESCRIPTION OF THE PREFERRED EMBODIMENT

Figure 1:
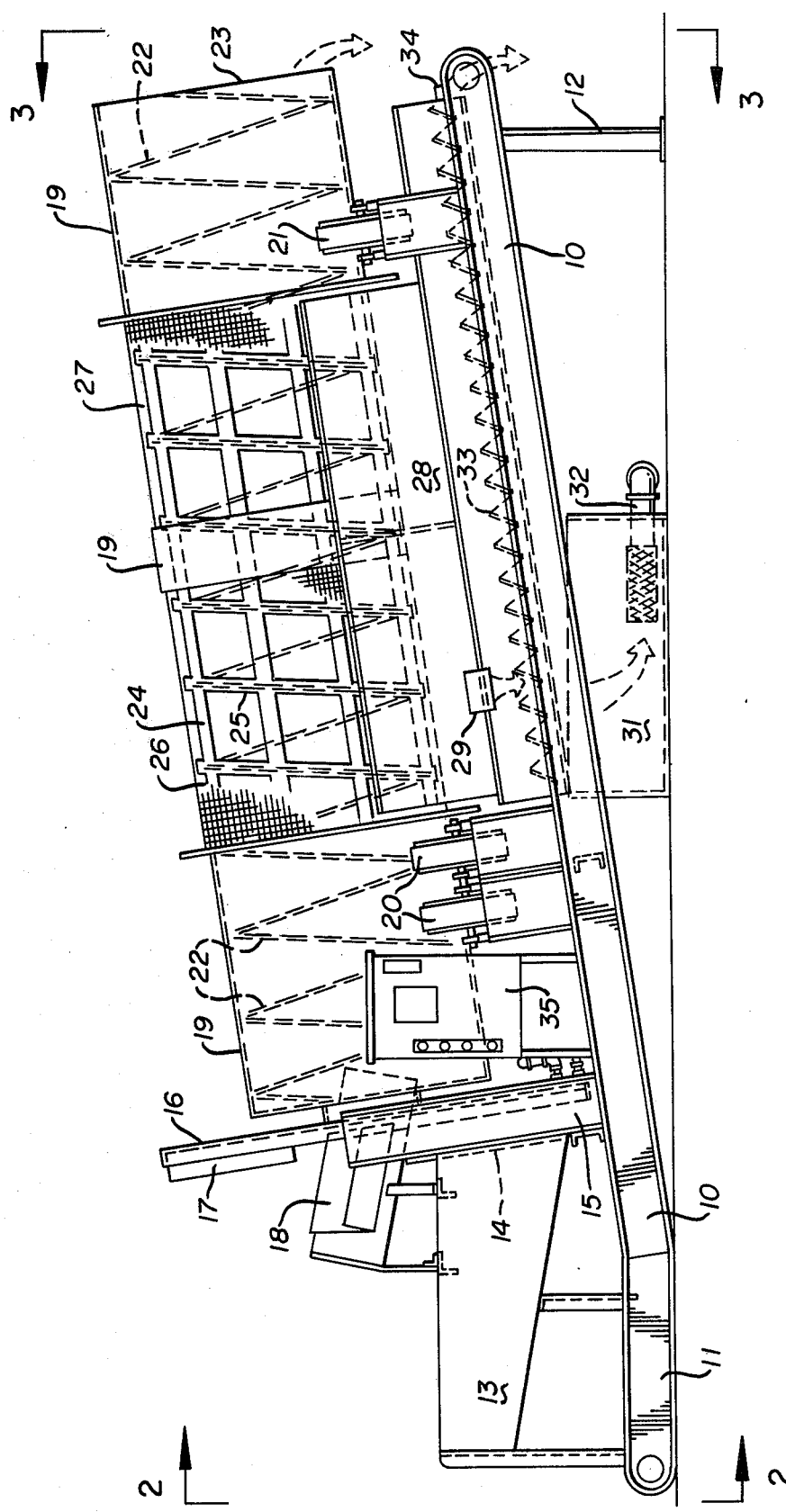
FIG. 1 is a side elevation with broken lines indicating hidden parts showing a machine for salvaging wet concrete material.
Figure 2:
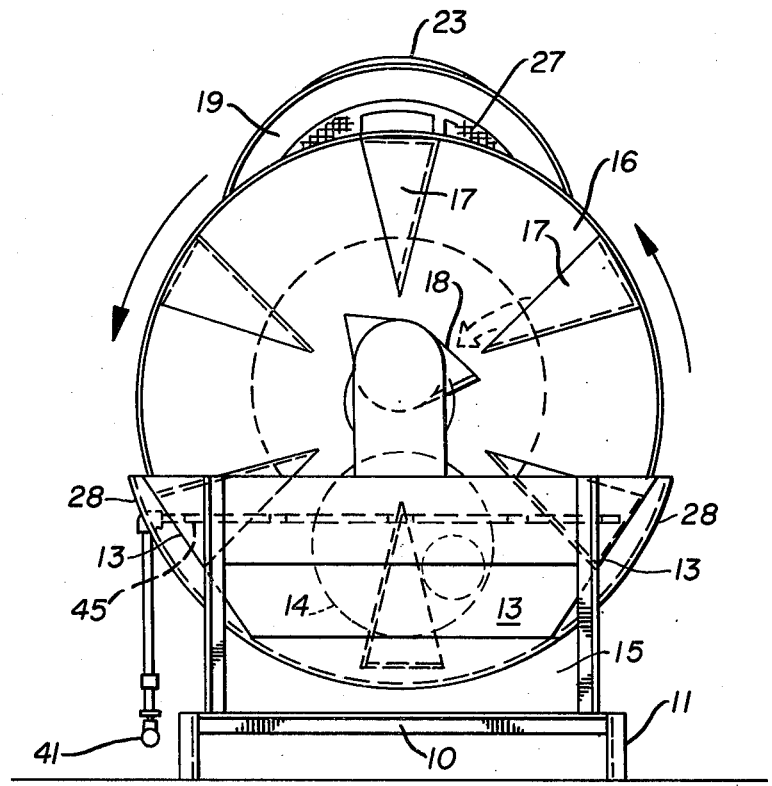
FIG. 2 is an end elevation on line 2—2 of FIG. 1.
Figure 3:
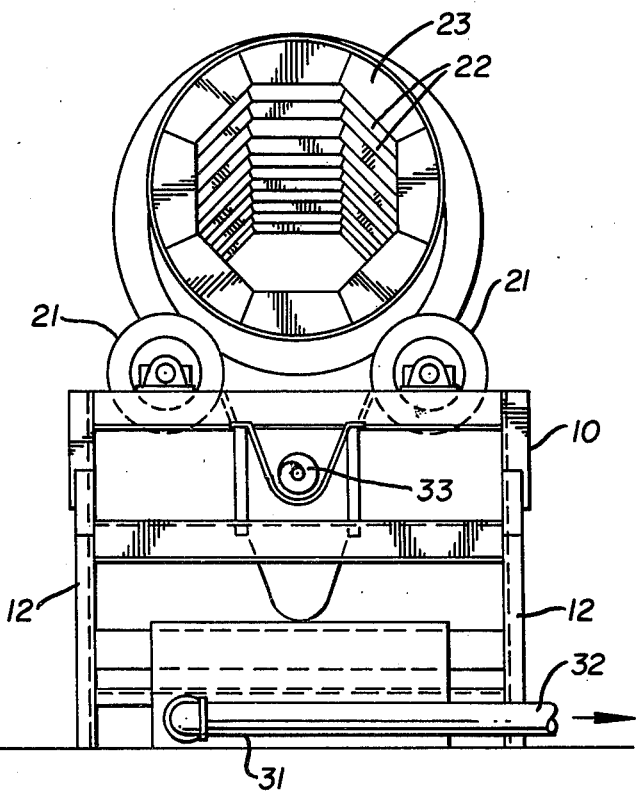
FIG. 3 is an opposite end elevation on line 3—3 of FIG. 1.

In the form chosen for illustration and description herein the machine for salvaging waste concrete material comprises an elongated frame 10, the major portion of which is inclined with a horizontal end extension 11 on one end thereof. The elevated end of the inclined frame 10 is supported on legs 12. A receiving hopper 13 is mounted on the frame 10 above the horizontal end portion 11 and is of a size sufficient to receive the residual mixed concrete from a ready mix truck along with an amount of rinse water averaging approximately 300 gallons more or less. Clean water is introduced into the receiving hopper 13 as hereinafter described.

A movable apertured disc 14 controls the discharge from a lower end of the receiving hopper 13 into a well 15 in which a rotary elevator 16 is located. A plurality of buckets 17 are arranged in circumferentially spaced, radially positioned relation on the rotary elevator 16 so that they will pick up the waste concrete material and water in the well 15 and discharge it into a charging chute 18 which extends through the open center of the rotary elevator 16 and into one end of a classifying drum 19 on which the rotary elevator 17 is mounted. The classifying drum 19 is rotatably positioned in spaced parallel relation to the inclined frame 10 and supported by drive wheels 20 and idler wheels 21 as will be understood by those skilled in the art.

The classifying drum 19 is arranged on the drive and idler wheels 20 and 21 so that it rotates on its longitudinal axis and it is provided on its inner surface with a continuously extending spiral conveyor 22 so that the concrete material and water delivered into the lower end thereof from the charging chute 18 will be continuously conveyed toward the upper end of the classifying drum 19 with the large aggregate discharged out of the open upper end 23 thereof.

Figure 4:
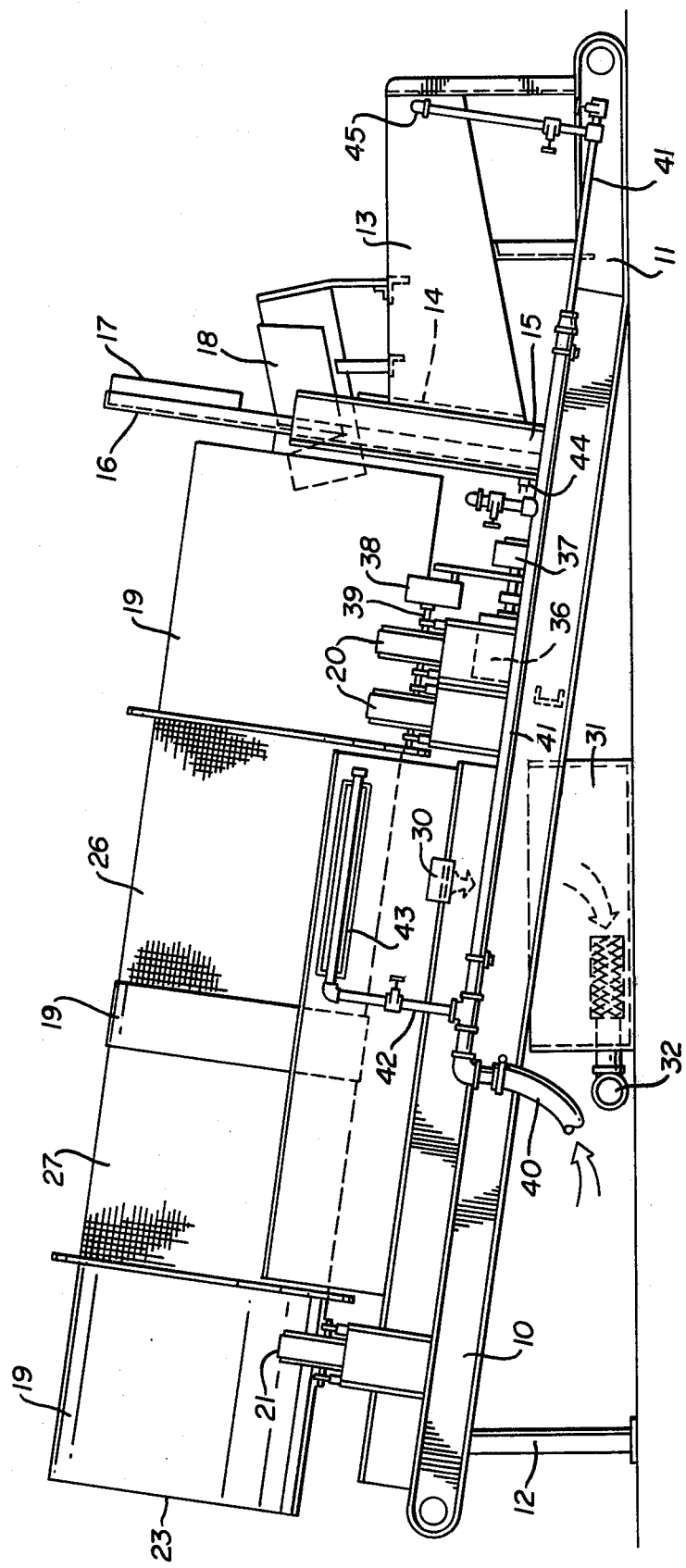
FIG. 4 is an opposite side elevation with respect to FIG. 1.

Intermediate portions of the classifying drum 19 are formed of open framework members 24, some of which are spirally arranged as at 25 to support the spiral conveyor 22 and a fine sand screen 26 covers one portion of the classifying drum 19 and a course sand screen 27 covers an adjacent section thereof as best seen in FIGS. 1 and 4 of the drawings. It will be observed that the classifying drum is arranged in substantially equal quarter sections, the first section carrying the rotary elevator 16 has an unbroken cylindrical body, the second and third sections comprising the fine sand screen 26 and the coarse sand screen 27 and the fourth section has an unbroken cylindrical wall defining the open end 23.

The lower three-fifths of the screen sections of the classifying drum 23 is positioned within a cross sectionally arcuate receiving trough 28 from which drain openings 29 and 30 provide a discharge route for the water, fine sand and cement, which are directed into an angularly disposed screw conveyor 33 which is positioned on the inclined frame 10 and parallel therewith. The screw conveyor 33 is positioned in a longitudinally extending trough. The water, the very fine sand and cement flows out of the trough and into a sump 31 which acts as a settling tank. A pipe 32 communicates therewith. The remaining material passes over the coarse screen 27 from which the coarse sands and small particles of aggregate and the like are discharged onto the screw conveyor 33 so that the coarse sand and the like are moved outwardly to a discharge end 34. The aggregate continues across the course screen 27 and through the upper quarter section of the classifying drum 19 and is discharged out of the upper end 23 of the classifying drum. The points of discharge are separated horizontally so that the recovered course sand and aggregate are deposited in separate locations.

The means for rotating the classifying drum comprises an electric motor 36 as best seen in FIG. 4 of the drawings, which is coupled to drive components 37 and 38 which includes gear reduction units connected to drive shafts 39 on which the drive wheels 20 are secured. A control panel 35 on the frame 10 directly controls the electric motor 36 as well as a motor driven pump not shown which communicates with the pipe 32 leading from the sump or settling tank 31 as heretofore described. Clean water from the sump or settling tank 31 or another source is delivered to the machine by a delivery tube 40 which communicates with a supply pipe 41. A branch 42 of the supply pipe 41 communicates with a fine screen spray bar 43 located exteriorly of the fine sand screen 26 area of the classifying drum 19 so that water directed therefrom continually washes the fine sand and cement from the screen 26 and into the lower end of the screw conveyor 33 from whence it is discharged directly into the sump 31.

The supply pipe 41 extends along the frame 10 to a series of nozzles 44 in the lower end of the well 15, the arrangement being such that cement, fine sand and aggregate adhereing to the rotary elevator 16 and the buckets 17 thereof are continuously removed therefrom. A further extension of the supply pipe 41 communicates with a spray bar 45 in the upper outer end of the receiving hopper 13.

It will thus be seen that a machine for salvaging wet concrete material has been disclosed which receives, washes, classifies and separates the cement, fine and course sands and aggregates and makes the same available for reuse and at the same time and most importantly enables the residual mixed concrete in ready mix trucks and the like to be conveniently and desirably processed for an environmentally safe disposal.

Although but one embodiment of the present invention has been illustrated and described, it will be apparent to those skilled in the art that various changes and modifications may be made therein without departing from the spirit of the invention.

Having thus described my invention what I claim is:

1. In a machine for separating and salvaging cement, fine and coarse sand and aggregate from wet concrete material and water having an inclined frame, a classifying drum mounted for axial rotation above and parallel with said inclined frame and means for rotating said classifying drum; the improvement comprising forming said classifying drum with a first section adjacent its lower end incorporating an unbroken cylindrical wall, a second section adjacent thereto incorporating a fine sand screen cylindrical wall, a third section adjacent said second section incorporating a coarse sand screen cylindrical wall and a fourth section adjacent thereto incorporating an unbroken cylindrical wall with an open end, a spiral conveyor in said classifying drum attached to and extending continuously throughout said classifying drum, a receiving hopper and a well on said frame at the lower end thereof and adjacent the lower end of said classifying drum for receiving said wet concrete material and water, said hopper communicating with said well, a rotary elevator attached to the first section of said classifying drum for rotation therewith and partially disposed within said well and valve means comprising a movable apertured disc controlling communication between said hopper and said well, a discharge chute positioned through a central opening in said rotary elevator and extending into said first section of said classifying drum and arranged to receive said concrete material and water delivered thereto by said rotary elevator from said well and deliver said concrete material and water into said first section of said classifying drum, a receiving trough disposed under the screen cylindrical walls of said classifying drum for receiving water, cement and coarse and fine sand passing therethrough, openings in said receiving trough and a conveyor positioned on said frame and parallel therewith and beneath said openings in said trough for moving sand from beneath said receiving trough, a settling tank and a sump positioned beneath said conveyor for receiving said water, cement and fine sand therefrom and a water supply system arranged for communication with a water source, a spray bar in communication with said water supply system and positioned exteriorly of said fine sand screen cylindrical wall of said classifying drum for directing water thereagainst, said water supply system extended to and communicating with said well and said receiving hopper and arranged for directing wash water against said rotary elevator.

2. The improvement in a machine for salvaging wet concrete material as set forth in claim 1 and wherein said means for rotating said classifying drum comprise driven and idler wheels rotatably positioned on said frame and engaging the first and fourth sections of said classifying drum.

3. The improvement in a machine for salvaging wet concrete material as set forth in claim 1 and wherein said means for rotating said classifying drum comprise driven and idler wheels rotatably positioned on said frame and engaging the first and fourth sections of said classifying drum and drive components comprising a source of rotary power arranged to rotate said drive wheels.

4. The improvement in a machine for salvaging wet concrete material as set forth in claim 1 and wherein said valve means controlling communication between said hopper and said well comprises an apertured disc movable relative to a communicating opening in said hopper whereby varying amounts of material from said hopper can be delivered to said well.

5. The machine for salvaging wet concrete material set forth in claim 1 and wherein said second section and said third section of said classifying drum are formed of open framework in a cylindrical shape with wire screen positioned over said open framework.

6. The machine for salvaging wet concrete material set forth in claim 1 and wherein said second section and said third section of said classifying drum are formed of open framework in a cylindrical shape with wire screen positioned over said open framework and wherein said spiral conveyor in said classifying drum is attached to the inner sides of said open framework in said second and third sections of said classifying drum.

7. The machine for salvaging wet concrete material set forth in claim 1 and wherein said receiving hopper is of a size and shape for conveniently receiving a load of material from a ready mix truck along with wash water introduced into said ready mix truck.

8. The machine for salvaging wet concrete material as set forth in claim 1 and wherein water circulating means communicates with said sump and settling tank.

* * * * *